(12) United States Patent
Oddsen, Jr.

(10) Patent No.: US 6,499,704 B2
(45) Date of Patent: Dec. 31, 2002

(54) POLESTAND APPARATUS FOR MOUNTING ELECTRONIC DEVICES

(75) Inventor: Odd N. Oddsen, Jr., Easton, PA (US)

(73) Assignee: Innovative Office Products, Inc., Easton, PA (US)

( * ) Notice: Subject to any disclaimer, the term of this patent is extended or adjusted under 35 U.S.C. 154(b) by 0 days.

(21) Appl. No.: 09/478,281

(22) Filed: Jan. 5, 2000

(65) Prior Publication Data

US 2002/0060278 A1 May 23, 2002

Related U.S. Application Data

(60) Provisional application No. 06/137,087, filed on Jun. 2, 1999.

(51) Int. Cl.[7] .................................................. A47F 5/00
(52) U.S. Cl. ............................ 248/125.1; 248/122.1; 248/295.11
(58) Field of Search .............................. 248/121, 122.1, 248/125.1, 125.3, 407, 411, 413, 298.1, 295.11, 229.1, 229.2, 315, 519, 218.4, 161, 125.8, 125.7, 223.41, 222.13, 222.14, 126, 124.2; 403/359.6, 383

(56) References Cited

U.S. PATENT DOCUMENTS

| 3,131,900 A | 5/1964 | Anderson et al. ............ 248/210 |
|---|---|---|
| 3,424,419 A | 1/1969 | Siegel ......................... 248/226 |
| 3,489,383 A | 1/1970 | Anson ......................... 248/226 |
| 3,533,583 A | * 10/1970 | Azim ....................... 248/125.2 |
| 5,385,323 A | * 1/1995 | Garelick ..................... 248/161 |
| 5,595,128 A | * 1/1997 | De Ladurantaye et al. . 108/140 |
| 5,615,854 A | * 4/1997 | Nomura et al. .......... 248/287.1 |
| 5,642,819 A | 7/1997 | Ronia ....................... 211/86.01 |
| 5,664,750 A | 9/1997 | Cohen .................... 248/231.71 |
| 5,681,017 A | 10/1997 | Clausen .................... 248/125.1 |
| 5,772,162 A | 6/1998 | Lin ............................ 248/121 |
| 5,938,534 A | 8/1999 | Kurian et al. ................ 464/162 |
| 6,012,591 A | * 1/2000 | Brandenberg ................ 211/26 |
| 6,086,028 A | * 7/2000 | Pfister ..................... 248/188.8 |

* cited by examiner

Primary Examiner—Leslie A. Braun
Assistant Examiner—Gwendolyn Baxter
(74) Attorney, Agent, or Firm—Lerner, David, Littenberg, Krumholz & Mentlik, LLP

(57) ABSTRACT

A polestand that supports and elevates peripheral devices such as electronic flat screen computer monitors. The polestand has either a base, a pole, and a collar or a pole, which can be vertically secured, and a collar. The collar has a support mount that accommodates components including a moveable extension arm and a tilter which are attached to the peripheral device. The polestand is balanced in such a way as to prevent or minimize the risk of tipping.

34 Claims, 9 Drawing Sheets

POLESTAND APPARATUS FOR MOUNTING ELECTRONIC DEVICES

This application claims the benefit of U.S. Provisional Application 60/137,087, filed Jun. 2, 1999.

FIELD OF THE INVENTION

This invention relates to a stand for mounting peripheral device, and more particularly, to a polestand for elevating and supporting a flat-screen electronic peripheral device, such as a computer monitor or television.

BACKGROUND OF THE INVENTION

Adjustable stands for use with electronic or other equipment are known in the prior art. Such stands are useful when it is required to elevate a device off a floor, a desk, or other surface, in order that the device meets eye-level or some other desired height. Stands also serve to hold cumbersome objects that are not designed to be placed directly on a surface due to ventilation requirements or other concerns.

In conjunction with stands, it is known in the art to also provide mechanical extension arms and/or tilters in order to position the supported equipment. Typically, an extension arm is attached to the stand and may then be attached to, among other things, a computer monitor. The arm enables the user to linearly position the device along one or more axes. Such extension arms are shown and described in Applicant's co-pending patent applications': "An Arm Apparatus for Mounting Electronic Devices", filed on Sep. 24, 1999 and assigned Application No. 09/405,628, which claimed priority of the Provisional Application No. 60/133,378, filed on May 10, 1999, and "Arm Apparatus for Mounting Electronic Devices with Cable Management System" filed on Sep. 24, 1999 and assigned Application No. 09/406,006, which claimed the priority of the Provisional Application No. 60/138,120 filed on Jun. 7, 1999. These co-pending applications are incorporated by reference herein as fully as if they were set forth in their entirety.

In order that a device may be positioned with even greater precision, a tilter is typically employed that allows a device to be rotated about one or more axis. The tilter may be attached to the extension arm previously discussed, or attached directly to the stand. One such tilter is shown and described in Applicant's co-pending patent application entitled "A Tilter for Positioning Electronic Devices", filed on Sep. 27, 1999 and assigned Application No. 09/406,530, which claimed the priority of the Provisional Application No. 60/137,088, filed on Jun. 2, 1999. This co-pending application is incorporated by reference herein as fully as if it were set forth in its entirety.

In the prior art, when an electronic device such as a computer monitor or a television was desired to be positioned and/or removed from the surface of a desk, the device was provided with a extension arm connected to a stand. The stand was either clamped to the desk or provided with a heavy base which helped to keep the device from tipping over.

However, the stands of the prior art are not well suited for use with flat-screen devices, such as flat-screen computer monitors and televisions. For instance, one of the reasons that flat-screen devices are increasing in popularity is due the fact that they require a minimal amount of space and are relatively lightweight. Because stands were often meant to support the weight of a large monitor, they often consisted of the extension arm firmly clamped to a rigid surface.

A common prior art stand, often provided with monitors, consists of a base constructed from a sturdy plastic material. A tilter is often included as part of the base, allowing the monitor to be rotated and tilted. However, such a stand has many limitations. For example, in order that it may support relatively large computer monitors, the base of such a stand must itself be relatively large and thus requires an abundance of desk space. Furthermore, these stands typically require that the center of gravity of the monitor remains directly above the stand. This is necessary to prevent the weight of the monitor from tipping over the stand. Another problem with prior art stands is that they cannot be used interchangeably with various tilters, extension arms, and the like.

Thus, there is a need for a polestand device that is suitable for supporting an electronic peripheral device, such as a flat-screen computer monitor or television, and that can accommodate various extension arms and tilters.

SUMMARY OF THE INVENTION

The present invention provides a polestand that supports and elevates peripheral devices. The present invention is further designed to accommodate electronic flat screen computer monitors and television screens. It is also capable of operating interchangeably with extension arms, tilters, and other devices.

Thus, according to one embodiment of the invention, a polestand is provided having a base, a pole attached to the base, and a collar which is positionable on the pole. The collar is provided with a support mount that can receive various components which may in turn be attached to a peripheral device.

According to other embodiments of the invention, a polestand is provided having a pole secured in a vertical manner, and a collar which is positionable on the pole. The collar is provided with a support mount that can receive various components which may in turn be attached to a peripheral device. The polestand also may have more than one collar.

The above descriptions set forth rather broadly the more important features of the present invention in order that the detailed descriptions thereof that follow may be understood, and in order that the present contributions to the art may be better appreciated. Other objects and features of the present invention will become apparent from the following detailed descriptions considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views:

FIG. 5b is an enlargement of the section B of the pole illustrated in FIG. 5a;

FIG. 6b is an enlargement of the section C of the collar illustrated in FIG. 6a;

DETAILED DESCRIPTION OF THE INVENTION

Figure 1:
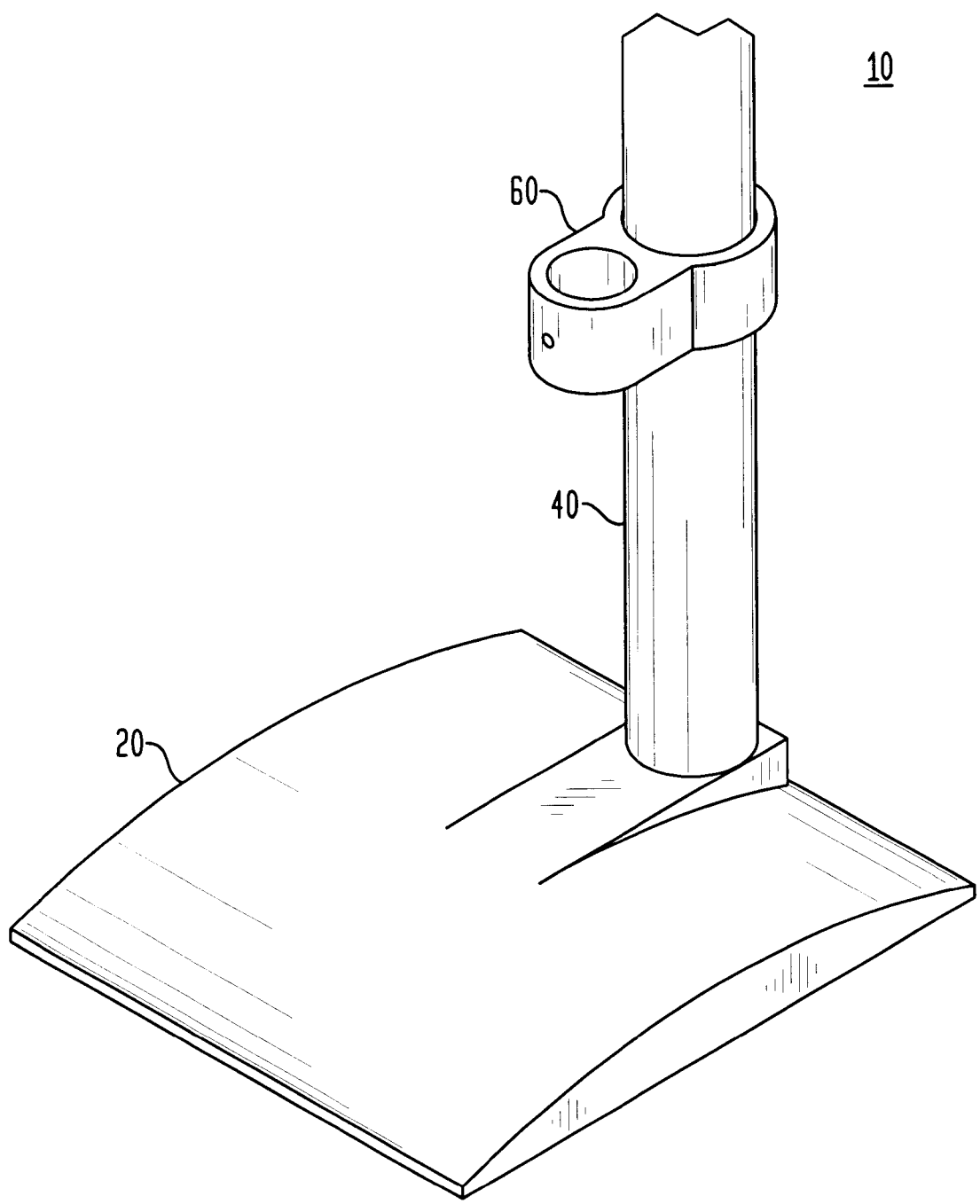
FIG. 1 is a perspective view of a polestand having a base, a pole, and a collar according to one embodiment of the invention.

The present invention, in accordance with one embodiment, relates to a polestand 10, illustrated in FIG. 1, capable of supporting a peripheral device, such as a flat-screen computer monitor, television, other electronic device or the like. The polestand 10 is configured so that it may be used in conjunction with an arm apparatus and/or a tilter as described in Applicant's previously referenced co-pending applications. As shown in FIG. 1, the polestand 10 is comprised of a base 20, a pole 40, and a collar 60. These components allow a computer monitor to be supported at an adjustable distance from a surface.

Figure 2A:
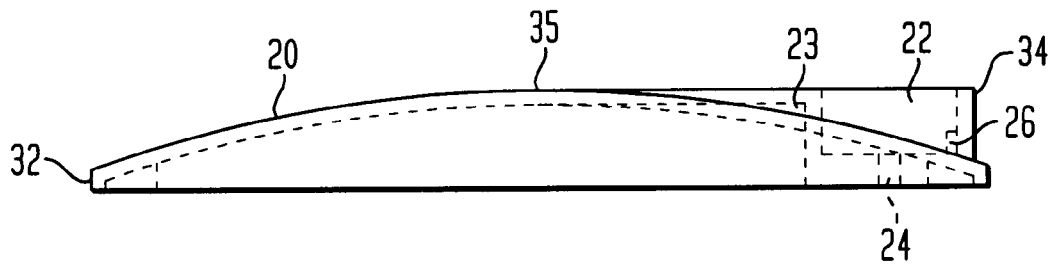
FIG. 2a is a side view of the base illustrated in FIG. 1 according to one embodiment of the invention.
Figure 2B:
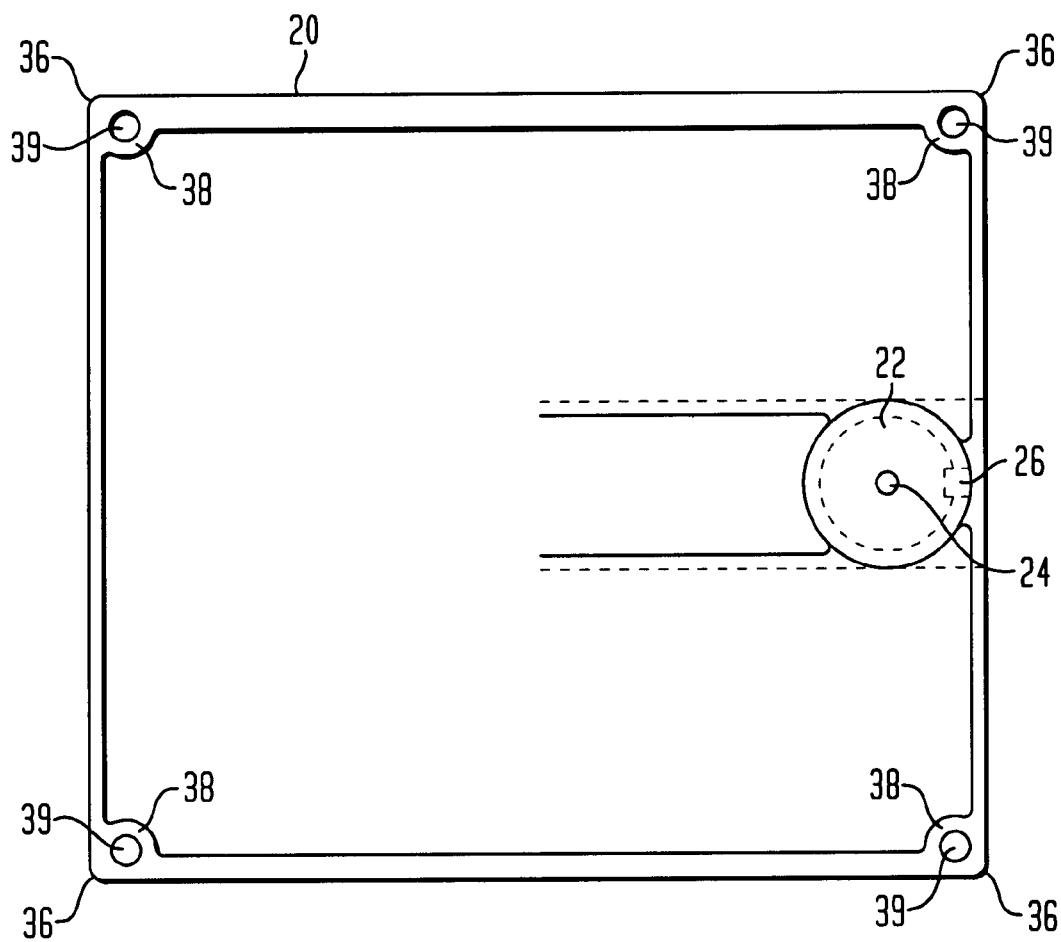
FIG. 2b is a bottom view of the base illustrated in FIG. 1 according to one embodiment of the invention.

With additional reference to FIGS. 2a and 2b, the base 20 is now described in more detail according to one embodiment of the invention. The base 20 is a block-shaped object having a hollow interior portion and a rectangular profile when viewed from below (FIG. 2b). In one embodiment, as illustrated in FIG. 2a, the top surface of the base 20 is curved from a front portion 32 to a rear portion 34. Thus, the thickness of the base 20 is relatively small at the front and rear portion 32, 34 and increases towards a center area 35. Such a shape is aesthetically pleasing and, importantly, is minimally obtrusive, allowing a monitor to be positioned near the surface on which the base 20 is located. A covering for the underside may be supplied but is not required. In order to provide stable support for an electronic device, the base 20 is preferably fabricated from a metal such as steel or aluminum, or from plastic.

Beginning at the center area 35, a boss 23 protrudes from the curved surface of the base 20 and extends to the rear portion 34 providing a flat surface. Within the boss 23 is a seat 22, such as an o-shaped seat, which has a key mating region 26, referred to as a third key mating region, disposed longitudinally along its surface. The third key mating region 26 may take the form of a key or a keyway and may have any appropriate cross-section including, but not limited to, one which is rectangular or triangular. At the center of the seat 22, is an opening or a hole 24 that communicates between the interior and exterior surface of the seat 22. As discussed in more detail below, the third key mating region 26 prevents the pole 40 from rotating in the seat 22, and the hole 24 aids in securing the pole 40 to the base 20.

Now specifically considering FIG. 2b, other features of the base 20 may be shown. In order to stiffen the base 20, additional material 38 is disposed in each corner 36. A shallow circular depression 39 is disposed in each area of additional material 38 to receive feet (not shown) fabricated from rubber or other appropriate material. Such feet help to prevent the base 20 from inadvertently being moved. In one embodiment of the invention, a weighted object (not shown), such as a relatively heavy piece of metal is secured to the hollow underside of the base 20 so as to permit the base 20 to be fabricated from a lighter, less costly material such as rigid plastic.

Figure 3A:
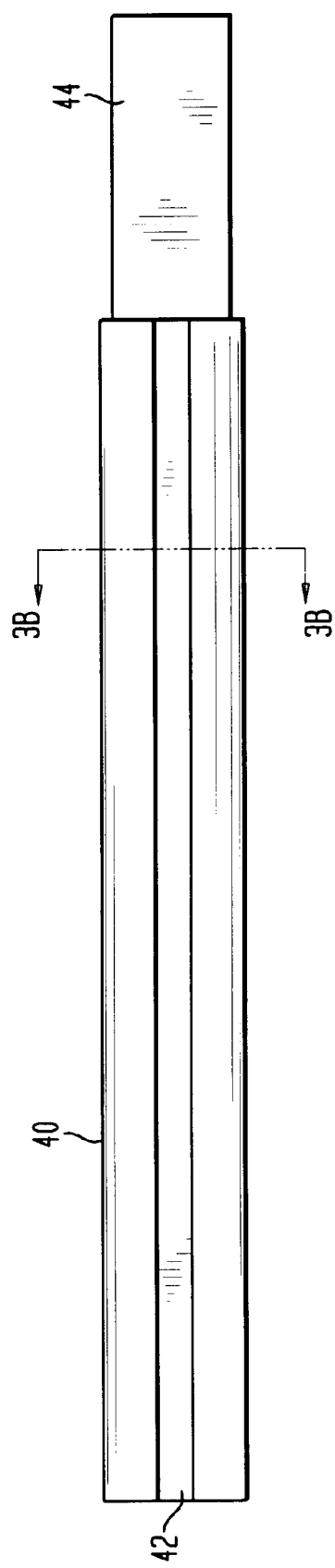
FIG. 3a is side view of the pole illustrated in FIG. 1 according to one embodiment of the invention.
Figure 3C:
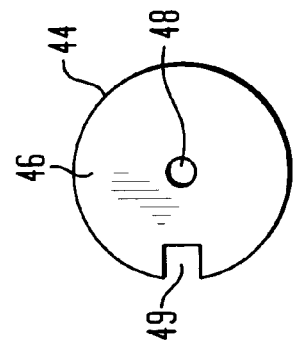
FIG. 3c is a rear view of the pole illustrated in FIG. 3a according to one embodiment of the invention.
Figure 3B:
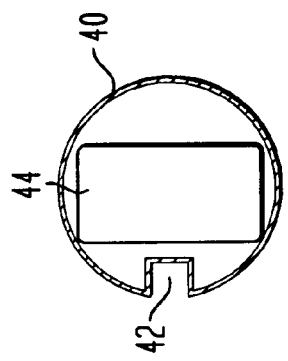
FIG. 3b is a sectional view through line A—A of the pole illustrated in FIG. 3a according to one embodiment of the invention.

With continued reference to FIG. 1 and now turning to FIGS. 3a and 3b, the pole 40 is now described in more detail. The pole 40 is a hollow, cylindrical object which is preferably fabricated from a rigid metal such as zinc. Because the pole 40 is hollow, less material is used in its manufacture. In the preferred embodiment, the pole 40 has an outer diameter in the range of 1½ inches, a thickness of ⅒ inch, and a length of 12 inches. However, it is understood that the pole 40 may take on other appropriate dimensions.

In the preferred embodiment, as shown in FIG. 3a, a key mating region 42, referred to as a first key mating region, is disposed longitudinally along the entire length of the pole 40. However, in other embodiments, the first key mating region 42 may only extend part of the length of the pole 40. The first key mating region 42 may take the form of a key or a keyway and may have any appropriate cross-section including, but not limited to, one which is rectangular or triangular. However, the first key mating region 42 must have a shape which allows it to engage the third key mating region 26 of the base 20. The first key mating region 42 may be machined into the pole 40 provided that the pole 40 has an appropriate thickness. Alternatively, the first key mating region 42 may be part of an extrusion that creates the pole 40.

In one embodiment, an extender 44 is provided that slides within the pole 40. The extender 44 preferably has a rectangular cross section and is about half the length of the pole 40. The dimensions of the cross section are dictated by the inner diameter of the pole 40 and the first key mating region 42. It is preferred that the extender 44, while capable of sliding in and out of the pole 40, fits securely and is not rotatable within the pole 40. The extender 44 is secured relative to the pole 40 (so as to prevent movement after it is placed in a desired position) by a set screw (not shown) or by any such means now known or later conceived. The extender 44 provides additional adjustability to devices mounted thereon.

Figure 3D:
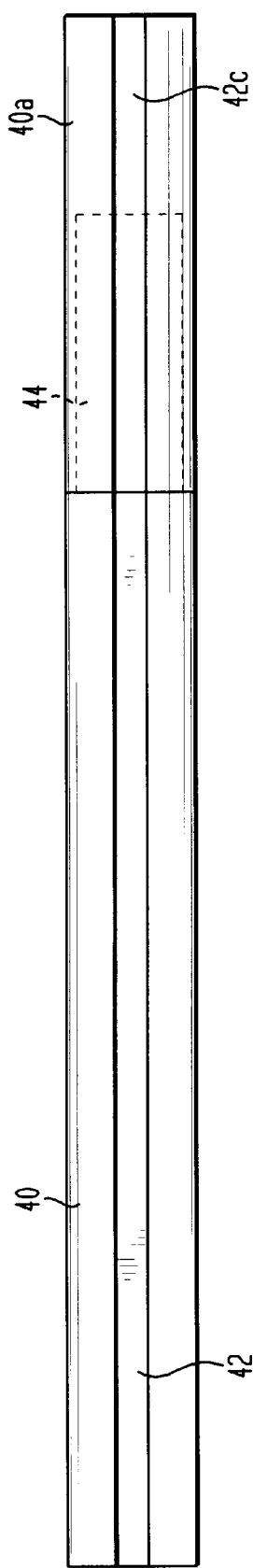
FIG. 3d is a side view of a second pole attached to the pole illustrated in FIG. 3a according to one embodiment of the invention.
Figure 3E:
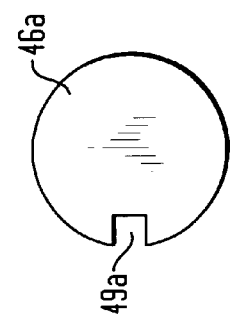
FIG. 3e is a top view of the second pole illustrated in FIG. 3d according to one embodiment of the invention.

A second pole 40a, as shown in FIG. 3d, may be slidingly inserted over the extended portion of the extender 44. Preferably, the second pole 40a will possess the same diameter and thickness as the pole 40, thereby enabling the second pole 40a to rest on top of the pole 40. Alternatively, the second pole 40a may contain an enclosed top end 46a, shown in FIG. 3e, which may rest on top of the extender 44. The second pole 40a also may be attached to the pole 40 and/or the extender 44 by other means currently known in the art or later conceived. The second pole 40a further will have a key mating region 42c, referred to as a fourth key mating region. Preferably, the fourth key mating region 42c will have the same dimensions as the first key mating region 42 of the pole 40, in conjunction with which the second pole 40a is used. The enclosed top end 46a will include either a notch 49a or an extrusion corresponding to the shape of the fourth key mating region 42c.

As shown in FIG. 3c, at one end of the pole 40, a cap 46, such as a disc-shaped cap, may be provided having a tapped hole 48 and a notch 49 corresponding to the first key mating region 42. The cap 46 may be spot welded to the end of the pole 40 or otherwise appropriately affixed. As explained immediately below, the cap 46 serves as an end region of the pole 40 and aids in securing the pole 40 to the base 20.

The pole 40 is inserted into the seat 22 of the base 20 such that the first key mating region 42 engages the third key mating region 26. The engagement between the third and the first key mating regions 26, 42 prevents the pole 40 from rotating within the seat 22. A threaded fastener (not shown) is now inserted through the hole 24 of the base 20 and is screwed into the tapped hole 48 of the cap 46 leaving the pole 40 securely attached to the base 20.

Figure 4A:
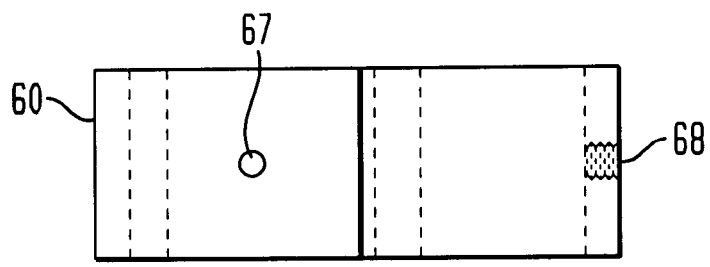
FIG. 4a is aside view of the collar illustrated in FIG. 1 according to one embodiment of the invention.
Figure 4B:
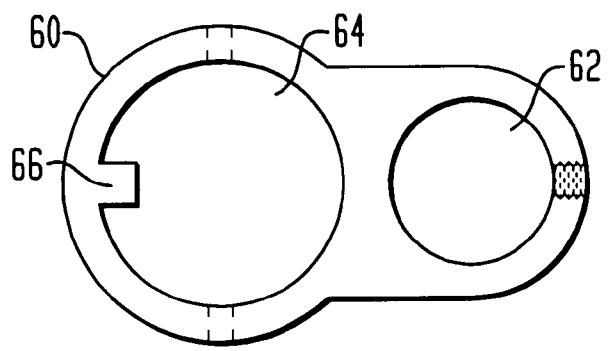
FIG. 4b is top view of the collar illustrated in FIG. 1 according to one embodiment of the invention.
Figure 4C:
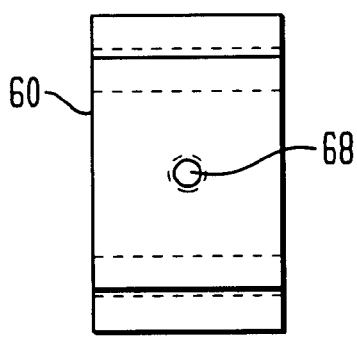
FIG. 4c is a front view of the collar illustrated in FIG. 1 according to one embodiment of the invention.

With continued reference to FIG. 1 and with further reference to FIGS. 4a, 4b, and 4c, the collar 60 is described in more detail. Preferably, the collar 60 is fabricated from a one inch thick piece of relatively stiff, relatively lightweight metal and is shaped to accommodate a pole opening 64 and a support mount 62. Because the pole opening 64 and the support mount 62 both are incorporated in a single collar 60, brackets and the like are not needed to support the device on the polestand 10.

The pole opening 64 is circular in shape and has a diameter which is slightly larger than the outer diameter of the pole 40. A key mating region 66, referred to as a second key mating region, is disposed longitudinally along the pole opening 64. The second key mating region 66 may take the form of a key or a keyway and may have any appropriate cross-section including, but not limited to, one which is rectangular or triangular. However, the second key mating region 66 must take on a shape which allows it to engage the first key mating region 42 of the pole 40. Thus, the collar 60 is placed over the pole 40 via the pole opening 64, wherein the engagement of the first and the second key mating regions 42, 66 prevents the collar 60 from rotating about the pole 40. A first tapped set screw hole 67 is preferably disposed at an angle of 90 degrees from the position of the second key mating region 66. After the collar 60 is placed on the pole 40, a set screw (not shown) may be screwed into the first tapped set screw hole 67 and forced against the pole 40, preventing vertical movement of the collar 60 relative to the pole 40. If a second pole 40a has been attached to the pole 40, the collar 60 can be attached to the second pole 40a in the same manner in which collar 60 can be attached to the pole 40. When the collar 60 is attached to the second pole 40a, the second key mating region 66 engages the fourth key mating region 42c.

According to one embodiment, the support mount 62 is a circular opening capable of receiving the device (not shown) to be supported. Preferably, the device includes a shaft which is a part of the tilter or the extension arm described in Applicant's previously referenced co-pending applications. A second tapped set screw hole 68 is preferably disposed at a position that directly opposes the second key mating region 66 of the pole opening 64. A set screw (not shown) may be screwed into hole 68 and forced against the aforementioned shaft, helping to prevent both lateral rotation and vertical movement of the tilter or extension arm.

In one embodiment, the key mating regions 26, 42, and 66 are configured so that the support mount 62 is disposed in a region extending vertically above the base 20. Alternatively, in another embodiment, the configuration is such that the vertical centerline of the support mount 62 is aligned with the vertical centerline of the base 20. In yet another embodiment, the configuration is such that the center of gravity of the supported device is aligned with the vertical centerline of the base 20. The placement of the support mount 62 determines the stability of polestand 10 and thus is an important factor in the overall design of the polestand 10.

It is to be understood that prevention of vertical movement of the collar 60 relative to the pole 40 can be accomplished by other fixing means (not shown). The other fixing means can include, but are not limited to, tabs and the like projecting from the pole 40. Other fixing means can include increasing the diameter of the pole 40 from top to bottom, so that a slight cone shape is accomplished, thereby creating a snug fit when the diameter of the pole opening 64 coincides with the diameter of the pole 40. Thus, various collars 60 having varying pole opening diameters could be fixed at various heights along the pole 40 corresponding to the increasing diameter of the pole 40.

Figure 5A:
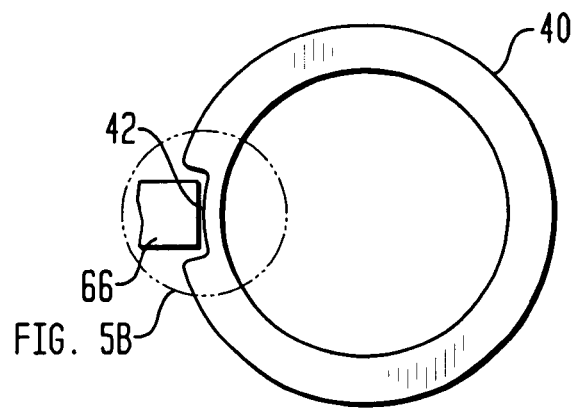
FIG. 5a is a top view of the pole illustrated in FIG. 1 according to one embodiment of the invention.

In another embodiment illustrated in FIGS. 5a, 5b, 6a and 6b, the first key mating region 42, of the pole 40, may be configured to permit lateral movement of the corresponding second key mating region 66, of the collar 60, about the first key mating region 42. This is accomplished by providing a keyway that is wider than the corresponding key, thereby allowing lateral movement of the key within the keyway. In FIG. 5a, the first key mating region 42 is illustrated in the form of a keyway, and the second key mating region 66 is in the form of a key. The first key mating region 42, of the pole 40, is wider than the second key mating region 66, of the collar 60.

Figure 5B:
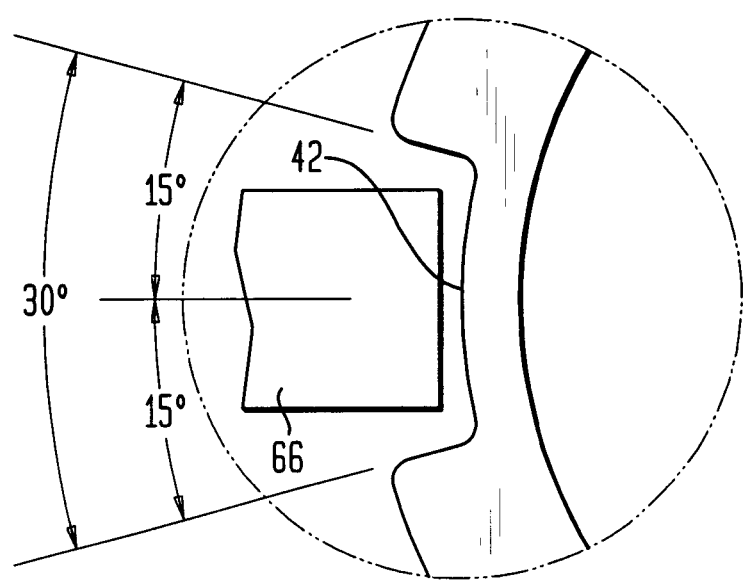

As shown in FIG. 5b, the second key mating region 66 in the form of a key is capable of rotating 15 degrees from a center axis 74. Because the second key mating region 66 can rotate 15 degrees from the center axis 74 in two directions from the center axis 74, the total range of lateral movement is 30 degrees.

Figure 6A:
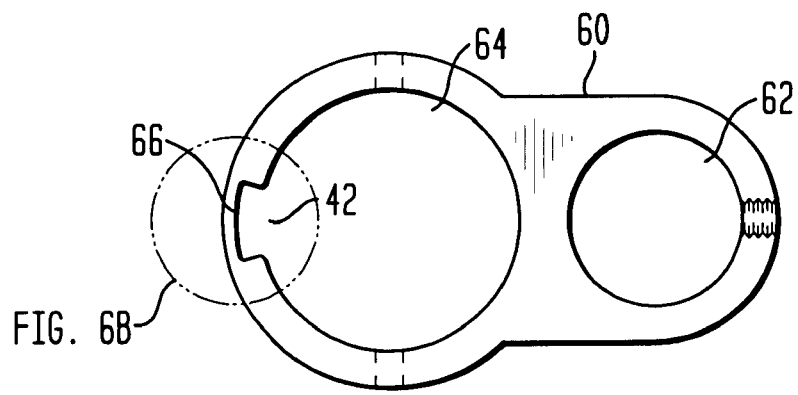
FIG. 6a is a top view of the collar illustrated in FIG. 1 according to one embodiment of the invention.
Figure 6B:
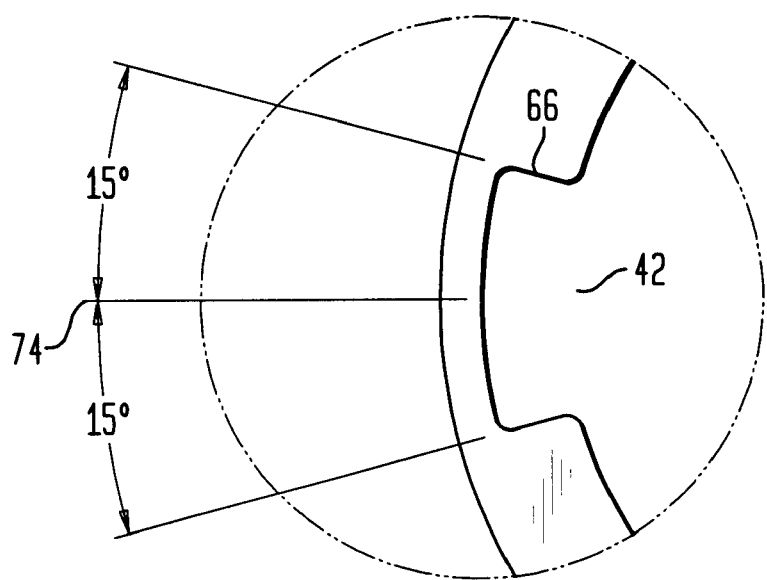

FIGS. 6a and 6b illustrate an embodiment in which the second key mating region 66, of the collar 60, is wider than the first key mating region 42, of the pole 40. In this embodiment, the second key mating region 66 is in the form of a keyway, and the first key mating region 42 is in the form of a key. FIG. 6b illustrates a 30 degree range of lateral movement of the collar 60, which is created by providing a 15 degree range of motion in two directions from a center axis 74.

These embodiments permit the collar 60 to be rotated about the pole 40 within a predetermined arc. Preferably, the key mating regions 42, 66 are configured to permit rotation of the collar 60 of between 30 and 45 degrees, more preferably between 15 and 30 degrees. By permitting partial rotation rather than requiring the collar 60 to be in a fixed position, the peripheral device that is attached to the collar 60 may also be placed in a range of positions about the pole 40. It is important however that the arc of rotation not extend too far from the center of the first key mating region 42 so that the weight of the peripheral device does not cause the pole stand 10 to topple. Once the desired vertical and rotational positions on the pole 40 have been determined, a set screw (not shown) in the first tapped set screw hole 67 of the collar 60 may be tightened against the pole 40 to prevent further movement of the collar 60.

Figure 7:
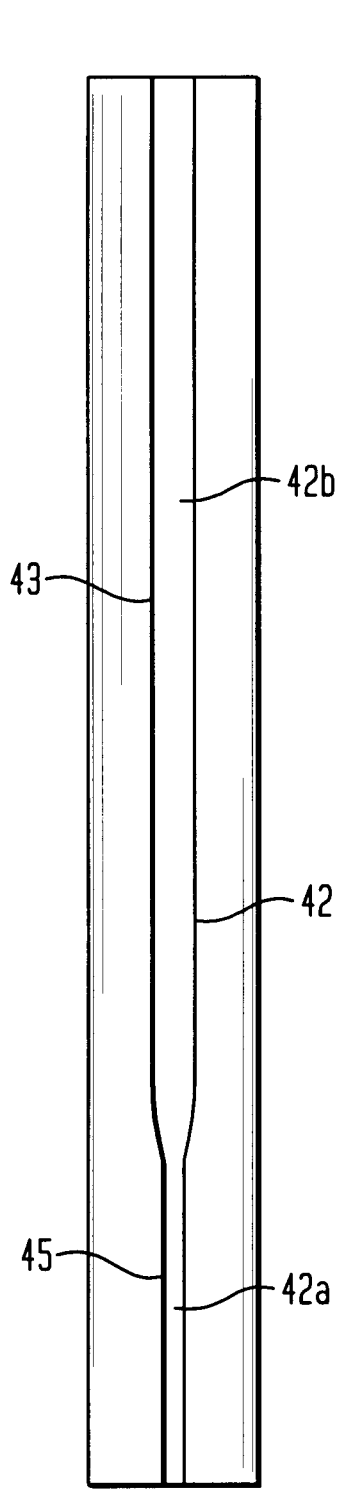
FIG. 7 is a side view of the pole illustrated in FIG. 1 according to one embodiment of the invention.

With continued reference to FIGS. 1, 5a and 5b, and now turning to FIG. 7, the pole 40 is described in more detail. In this embodiment, the first key mating region 42 is in the form of a keyway. The first key mating region 42 includes a collar region 42b and a base region 42a wherein the collar region 42b is wider than the base region 42a. The wider collar region 42b enables the collar 60 to rotate, as described in detail in reference to FIGS. 5a and 5b. At the same time, the narrower base region 42a enables the base region 42a to engage the third key mating region 26 of the base 20 in a fixed manner.

Figure 8:
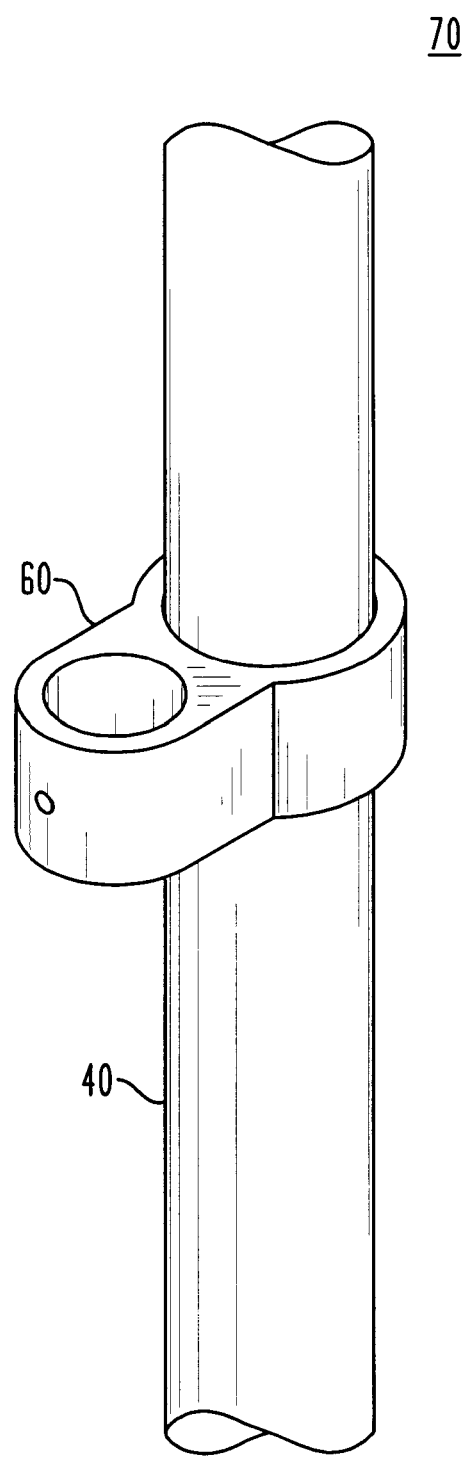
FIG. 8 is a perspective view of a polestand having a pole and a collar according to one embodiment of the invention.

Another embodiment of the polestand 10 is illustrated in FIG. 8, which is a perspective view of a polestand 70 having only a pole 40 and a collar 60. In this embodiment, the pole 40 and the collar 60 interact and function in all of the ways previously described with reference to FIGS. 1 through 7. However, in this embodiment, the pole 40 need not be vertically held in place by a base. Rather, the pole 40 may be vertically held in place by any number of securing means now known in the art or later conceived. By way of example, the pole 40 could be secured in a circular depression (not shown) in a surface, which could be in a desktop, floor, or the like. In addition, it is possible that the pole 40 could be vertically held in place by brackets (not shown) attached to both the pole 40 and a surface. Accordingly, in this embodiment, the securing means for the polestand 70 is discretionary.

It is further to be understood that the number of collars 60 that can be attached to the pole 40 and/or the second pole 40a in either the polestand 10 or the polestand 70 is discretionary. Provided the polestand 10, 70 is of sufficient strength and size, at least one additional collar (not shown) along with the collar 60 can be attached to the pole 40 and/or the second pole 40a, with the collar 60 and each additional collar (not shown) being located vertically above one another on the pole 40 and/or the second pole 40a.

Figure 9:
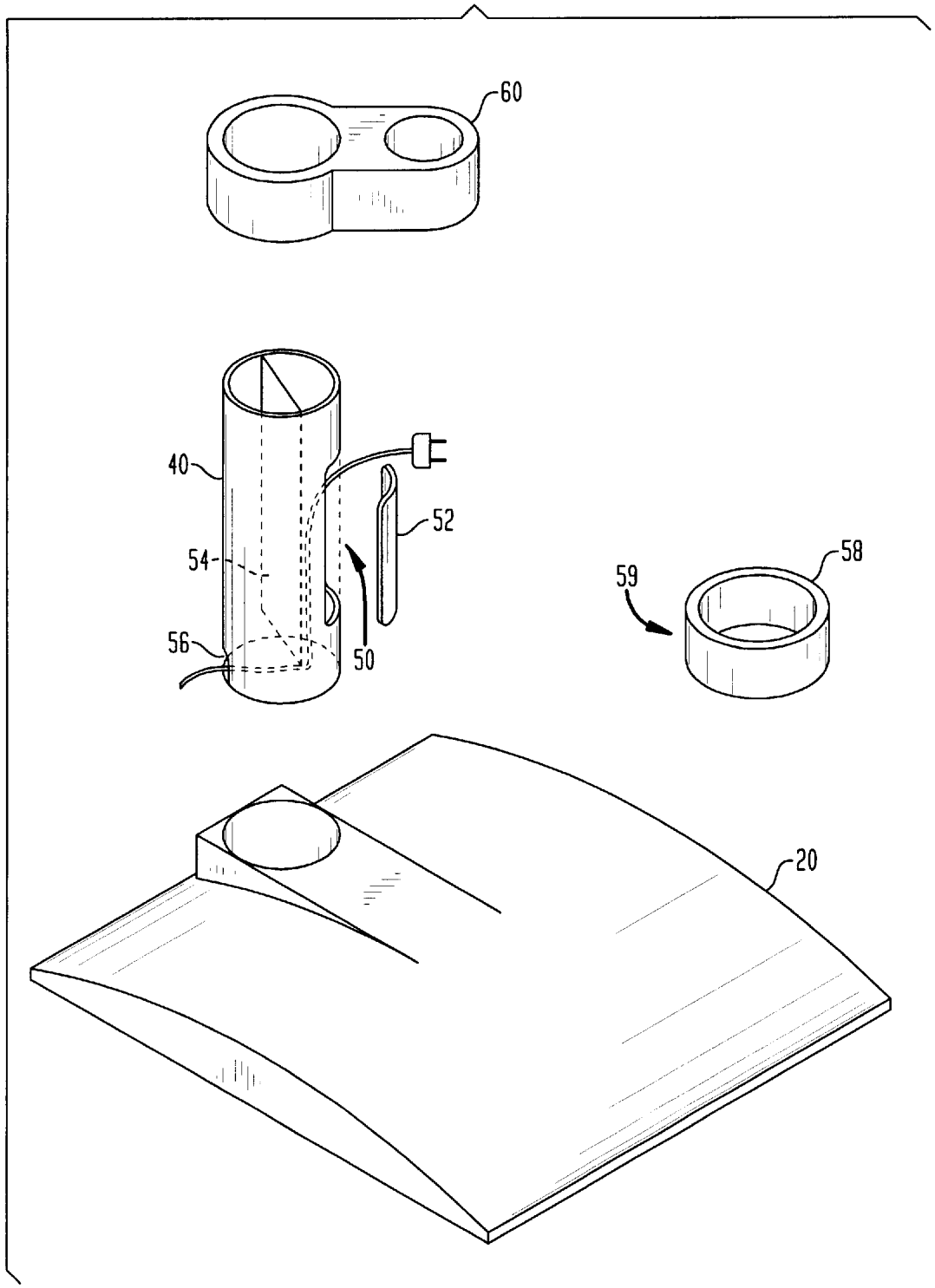
FIG. 9 is a perspective view of the pole illustrated in FIG. 1 according to one embodiment of the invention.

Another embodiment of the polestand 10 or the polestand 70, as illustrated in FIG. 9 includes a cable management system designed therein. That is, the pole 40 can house cables to and from the devices therewithin so as to be hidden from view yet still easily accessible. In this embodiment, the pole 40 includes an opening 50 formed therein. As illustrated, the opening 50 extends longitudinally along the entire length of the pole 40. However, as one skilled in the art would know the opening 50 may be formed having various lengths and configurations. For example, the length of the opening 50 may extend through only a small portion of the pole 40, through several separate and distinct portions of the pole 40, or through a majority of the pole 40. Likewise, the configuration of the opening 50 may have a cross section that is rectangular, oval or some other shape. The opening 50 may be formed in the pole 40 by, for example cutting the opening 50 therein, or the pole 40 may be formed with the opening 50 formed therein. The purpose of the opening 50 is to allow cables to travel through the pole 40, thus hidden from view, and exit the pole 40 at the appropriate location or locations to connect to the device or the devices mounted thereto. Thus, the configuration selected depends on the number of devices and corresponding collars 60 that are to be connected to the pole 40. The pole 40 also includes a cover 52 that is removably connected to the opening 50, so as to hide the cables therewithin while still providing easy access thereto.

The opening 50 is preferably on a side of the pole 40 that faces the front of the base 20 (for polestand 10) and the support mount 62 of the collar 60. The opening 50 may weaken the pole 40, especially if the opening 50 extends over a large portion the pole 40. Thus, to compensate for the weakening of the pole 40, a support member 54 is provided within the pole 40. The support member 54 as illustrated is a plate that extends through the center of the pole 40. However, one skilled in the art would realize that the support member 54 could take on multiple sizes, shapes and configurations without departing from the scope of the current invention.

Another embodiment of the polestand 10 or 70 with cable management, as illustrated in FIG. 9, includes a groove 56 formed in an opposite side of the pole from the opening 50. The groove 56 is formed adjacent to the end of the pole 40 the connects to the base 20 (for polestand 10) or the mounting surface (for polestand 70). The groove 56 starts at the edge of the pole 40 and extends laterally from the edge. The groove 56 is large enough to allow a cable to fit therethrough. Thus, in this configuration the cable can enter the pole 40 from behind the polestand 10 or 70, travel through the pole 40, and exit the front of the pole 40 at a position where a device is mounted to the collar 60. The groove 56 may weaken the end of the pole 40, so one embodiment includes extending the groove 56 by the thickness of a support shaft 58 and placing the support shaft 58 within the end of the pole 40 to provide support for the pole 40.

It is possible for one embodiment to include the groove being located where the first key mating region 42 would interact with the third key mating region 26. In this embodiment, the first key mating region 42 would not be located at the end of the pole. Thus, a fifth key mating region 59 would need to be formed in the support shaft 58, and the support shaft 58 would be inserted in to the pole 40 so that the fifth key mating region 59 was aligned with the third key mating region 26 and the groove 56. It should be noted that the cable needs to be inserted through the groove 56 prior to the support shaft 58 being inserted.

Having described the construction of the polestand 10 above, a polestand system and a description of its operation may now be provided. For ease of packaging, the polestand 10 will likely be provided to a user in an unassembled fashion. The user would simply attach the pole 40 to the base 20 as described above. The collar 60 is then placed on the pole 40 and positioned at the desired height and held in place by a set screw, which is threaded through first tapped set screw hole 67. The device being supported, such as a flat screen computer monitor, which may have been affixed to a tilter, may now be attached to the polestand 10 by engaging the shaft of the tilter with the support mount 62 of the collar 60. A set screw may be threaded through hole 68 and forced against the shaft to prevent lateral and vertical movement of the shaft.

Alternatively, an extension arm may first be attached to the polestand 10, via the support mount 62, and a tilter and monitor may then be affixed to an opposite end of the extension arm. Additional components may be utilized between the polestand 10 and the supported electronic device. It should also be noted that objects other than electronic devices, such as medical equipment, may be used in conjunction with the polestand 10.

The polestand 70 is assembled similarly to the assembly of the polestand 10. However, the polestand 70 does not have the base 20. Therefore, in this embodiment, the pole 40 may be secured in a vertical manner by any means currently known in the art or later conceived.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. A polestand apparatus for supporting a device, said polestand apparatus comprising:
   a pole having a longitudinally disposed first key mating region and an end region;
   a collar comprising a body having formed therein a pole opening and a support mount comprising a support opening arranged adjacent said pole opening, said collar having a surface that defines said pole opening and that has a second key mating region disposed therein, said second key mating region configured to engage said first key mating region of said pole so as to prevent relative rotation therebetween, said support opening of said support mount configured to receive said device to be supported, said pole opening including a first vertical axis and said support opening including a second vertical axis arranged parallel to said first axis, wherein said pole opening and said support opening are separated by a portion of said body forming said collar; and
   a base having a seat configured to secure said end region of said pole, said seat having a third key mating region configured to engage said first key mating region of said pole so as to prevent relative rotation therebetween.

2. The apparatus according to claim 1, wherein said first, second and third key mating regions are configured so that said support mount of said collar is disposed in a region extending vertically above said base.

3. The apparatus according to claim 2, wherein said first, second and third key mating regions are configured so that a vertical centerline of said support mount is aligned with a vertical centerline of said base.

4. The apparatus according to claim 2, wherein said first, second and third key mating regions are configured so that a center of gravity of said device is aligned with a vertical centerline of said base.

5. The apparatus according to claim 1, wherein said first key mating region is a keyway and said second and third key mating regions are keys.

6. The apparatus according to claim 1, wherein said first key mating region is a key and said second and third key mating regions are keyways.

7. The apparatus according to claim 1, wherein said collar is longitudinally slidable along said pole relative to said pole opening.

8. The apparatus according to claim 7, wherein said first key mating region is longitudinally disposed along the entire length of said pole.

9. The apparatus according to claim 7, wherein said first key mating region is longitudinally disposed along a length of said pole which is smaller than the entire length of said pole.

10. The apparatus according to claim 1, wherein said polestand further comprises an extender which slidingly engages said pole.

11. The apparatus according to claims 10, further comprising a second pole, said second pole slidingly engaging said extender.

12. The apparatus according to claim 1, wherein said seat has a hole for receiving a screw that engages said end region of said pole so as to detachably secure said pole to said base.

13. The apparatus according to claim 1, wherein said first key mating region and said second key mating region are configured to permit lateral movement of said collar when said collar is engaged on said pole.

14. The apparatus according to claim 13, wherein said lateral movement is a predetermined arc, said lateral movement being no greater than 45 degrees.

15. The apparatus according to claim 13, wherein said lateral movement is in a predetermined arc, said lateral movement being no greater than 30 degrees.

16. The apparatus according to claim 13, wherein said first key mating region is a keyway and said second and third key mating regions are keys.

17. The apparatus according to claim 16, wherein said first key mating region further has a collar region and a base region, said base region engaging said base and said collar region engaging said collar, said collar region being wider than said base region and said collar region being wider than said second key mating region.

18. The apparatus according to claim 13, wherein said first key mating region is a key and said second and third key mating regions are keyways.

19. The apparatus according to claim 1, further comprising at least one additional collar, wherein said collar and said at least one additional collar are located vertically above one another on said pole.

20. The apparatus of claim 1, wherein said pole further includes a cable management system.

21. The apparatus of claim 1, wherein said pole further includes an opening formed therein and a cover removably attachable to said opening.

22. The apparatus of claim 21, wherein said opening is formed on a side of said pole that faces said support mount of said collar.

23. The apparatus of claim 22, wherein said opening runs longitudinally along at least a portion of said pole.

24. The apparatus of claim 21, wherein said pole further includes a support member located therein.

25. The apparatus of claim 1, wherein said pole further includes a groove formed in said end region of said pole.

26. The apparatus of claim 25, further comprising a support shaft inserted into said end region of said pole.

27. A polestand for supporting a device, said polestand comprising:
   a pole having a longitudinally disposed first key mating region;
   a pole securing means configured to secure said pole in a vertical manner; and
   a collar comprising a body having formed therein a pole opening and a support mount comprising a support opening arranged adjacent said pole opening, said collar having a surface that defines said pole opening and that has a second key mating region disposed therein, said second key mating region configured to engage said first key mating region of said pole so as to prevent relative rotation therebetween, said support opening of said support mount configured to receive said device to be supported, said pole opening including a first vertical axis and said support opening including a second vertical axis arranged parallel to said first axis, wherein said pole opening and said support opening are separated by a portion of said body forming said collar.

28. The apparatus of claim 27, wherein said pole further includes a cable management system.

29. A polestand system for supporting a device, said polestand system comprising:

a pole having a longitudinally disposed first key mating region and an end region;

a collar comprising a body having formed therein a pole opening and a support mount comprising a support opening arranged adjacent said pole opening, said pole opening including a first vertical axis and said support opening including a second vertical axis arranged parallel to said first axis, wherein said pole opening and said support opening are separated by a portion of said body forming said collar, said collar having a surface that defines said pole opening and that has a second key mating region disposed thereon, said second key mating region configured to engage said first key mating region of said pole so as to prevent relative rotation therebetween, said support opening of said support mount configured to receive said device to be supported, said collar being slidingly engaged on said pole while engaging said first mating region and said second mating region;

a base having a seat configured to secure said end region of said pole, said seat having a third key mating region configured to engage said first key mating region of said pole so as to prevent relative rotation therebetween, said pole being secured to said base by inserting said end region into said seat while engaging said first mating region with said third mating region;

at least one set screw; and said collar further comprising a first tapped set screw hole in said pole opening, said at least one set screw being threaded through said first tapped set screw hole and abutting said pole so as to prevent vertical and lateral movement of said collar relative to said pole.

30. The polestand system of claim 29, wherein said collar further comprises a second tapped set screw hole in said support mount, said at least one set screw being threaded through said second tapped set screw hole and abutting said device being supported so as to prevent vertical and rotational movement of said support mount relative to said device.

31. The polestand system of claim 29, wherein said seat further comprises a hole for receiving a screw, said at least one screw being threaded through said hole and said end region of said pole so as to detachably secure said pole to said base.

32. A polestand for supporting a device, said polestand comprising:

a first pole having a longitudinally disposed first key mating region and an end region;

a collar having a pole opening and a support mount, said collar having a surface that defines said pole opening and that has a second key mating region disposed therein, said second key mating region configured to engage said first key mating region of said first pole so as to prevent relative rotation therebetween, said support mount configured to receive said device to be supported;

a base having a seat configured to secure said end region of said first pole, said seat having a third key mating region configured to engage said first key mating region of said first pole so as to prevent relative rotation therebetween;

an extender which slidingly engages said first pole; and a second pole slidingly engaging said extender.

33. A polestand for supporting a device, said polestand comprising:

a pole having a longitudinally disposed first key mating region and an end region having a groove;

a support shaft inserted into said end region of said pole;

a collar having a pole opening and a support mount, said collar having a surface that defines said pole opening and that has a second key mating region disposed therein, said second key mating region configured to engage said first key mating region of said pole so as to prevent relative rotation therebetween, said support mount configured to receive said device to be supported; and a base having a seat configured to secure said end region of said pole, said seat having a third key mating region configured to engage said first key mating region of said pole so as to prevent relative rotation therebetween.

34. A polestand system for supporting a device, said polestand system comprising:

a pole having a longitudinally disposed first key mating region and an end region;

a collar having a pole opening and a support mount, said collar having a surface that defines said pole opening and that has a second key mating region disposed thereon, said second key mating region configured to engage said first key mating region of said pole so as to prevent relative rotation therebetween, said support mount configured to receive said device to be supported, said collar being slidingly engaged on said pole while engaging said first mating region and said second mating region;

a base having a seat configured to secure said end region of said pole, said seat having a third key mating region configured to engage said first key mating region of said pole so as to prevent relative rotation therebetween, said pole being secured to said base by inserting said end region into said seat while engaging said first mating region with said third mating region;

at least one set screw;

said collar further including a first tapped set screw hole in said pole opening, said at least one set screw being threaded through said first tapped set screw hole and abutting said pole so as to prevent vertical and lateral movement of said collar relative to said pole, and a second tapped set screw hole in said support mount, said at least one set screw being threaded through said second tapped set screw hole adapted to abut said device so as to prevent vertical and rotational movement of said support mount relative to said device.

* * * * *